United States Patent [19]

McCabria

[11] Patent Number: 5,034,638
[45] Date of Patent: Jul. 23, 1991

[54] GENERATOR AUXILIARY MODE LUBRICATION SYSTEM AND METHOD

[75] Inventor: Jack L. McCabria, Lima, Ohio

[73] Assignee: Westinghouse Electric Corp., Pittsburgh, Pa.

[21] Appl. No.: 493,170

[22] Filed: Mar. 14, 1990

[51] Int. Cl.⁵ .................. H02K 9/00; H02K 9/19; H02K 9/24; H02K 7/08
[52] U.S. Cl. .................................. 310/54; 310/52; 310/58; 310/90
[58] Field of Search .................. 310/52, 53, 54, 57, 310/58, 59, 60 A, 60 R, 61, 63, 90, 112, 113; 322/33, 34; 290/2

[56] References Cited

U.S. PATENT DOCUMENTS

| | | | |
|---|---|---|---|
| 3,030,529 | 4/1962 | Jaeschke et al. | 310/53 |
| 3,089,045 | 5/1963 | Derks | 310/53 |
| 3,089,046 | 5/1963 | Jaeschke | 310/105 |
| 3,629,627 | 12/1971 | Pafler | 310/54 |
| 3,767,949 | 10/1973 | Newill | 310/90 |
| 4,221,982 | 9/1980 | Raver et al. | 310/59 |
| 4,262,224 | 4/1981 | Kofink et al. | 310/54 |
| 4,953,663 | 9/1990 | Sugden | 310/58 |

FOREIGN PATENT DOCUMENTS

| | | | |
|---|---|---|---|
| 0083438 | 6/1980 | Japan | 310/90 |
| 0009345 | 1/1985 | Japan | 310/54 |
| 0077340 | 4/1988 | Japan | 310/90 |

Primary Examiner—Steven L. Stephan
Assistant Examiner—C. LaBalle
Attorney, Agent, or Firm—J. L. Brzuszek

[57] ABSTRACT

A generator system having a failure mode cooling-oil lubricating auxiliary compartment structurally integrated into the generator casing so as to provide a supplement to primary cooling and lubrication functions. A coupled driving unit and generating unit of an aircraft generating system has primary pump cooling and lubricating functions during productive rotating electrical power generation, and cooling friction and windage cooling function and a residual lubrication function is used for critical rotating components, during a fault mode of electrical non-power output production in the generator. This is provided in order to retard or eliminate damage and destruction of the coupled driving and generator units during an extended interim without power output of a failed generator unit, such as when its primary cooling and lubricating components have ceased to function.

12 Claims, 4 Drawing Sheets

GENERATOR AUXILIARY MODE LUBRICATION SYSTEM AND METHOD

BACKGROUND OF THE INVENTION

This invention relates in general to generator lubrication systems, and more particularly, to aircraft generator, failure mode, cooling-oil lubricated operations for generator units, during an extended interim without power output from a failed generator unit, such as when its primary cooling and lubricating components have ceased to function.

Aviation safety and dependability for profitable operations necessitates redundancy of electrical power generators, as well as, delayed replacement of same so that electrical power continues to be supplied to all vital functions without interruption during relevant operating periods. This means that in a multi-engined aircraft, each engine can be used to power a generator system with each generator system being capable of fulfilling the entire electrical power output needs for the aircraft. This is often carried one step further in safety and redundancy by providing an auxiliary engine and generator which may be used mainly for meeting the aircraft's electrical power needs if there is an emergency with no other remaining back-up propulsion power paired operative generator system.

Aircraft generator lubrication systems have heretofore comprised multiple scavenging pump sections which circulate a fluid lubricant through casings and return a predetermined quantity of the fluid lubricant to a central reservoir which serves combined drive and generator units in an integrated fashion. Intermediate filtering and cooling operations are performed on the cooling-oil lubricant in order to siphon-off contaminants and provide for a stable operating temperature while the generator unit is providing the operating load requirements for output electrical power.

The driven generator system is thus mainly dependent on the cooling-oil fluid for these functions during the operative power producing state of an integrated unit such as in the patent entitled "Cooling Arrangement for and Integrated Drive-Generator System" which is U.S. Pat. No. 4,284,913 and is assigned to the same assignee as the present application. This type of generator system utilizes a constant speed drive transmission which interfaces with the propulsion engine. Its output shaft provides a constant speed so that constant frequency electrical power is provided by the generator system. One of the problems associated with this type of generator system is the excess weight that is introduced by the constant speed drive unit. However, it is possible to eliminate a substantial portion of the weight of the drive unit by more recent innovations in the art of variable speed generator systems.

A type of aircraft electrical power generation system to which this invention also pertains has found widespread acceptance because of its reduction in relative weight compared to generators of the constant speed type and because of the presence of state of the art electronic features. The variable speed constant frequency (VSCF) system according to U.S. Pat. No. 4,554,501, entitled "Variable Speed Constant Frequency Power System With Auxiliary DC Output" is assigned to the same assignee as the present invention, and it is hereby incorporated by reference into the present application and will be hereinafter referred to as the incorporated U.S. patent. This invention takes advantage of the inherent capabilities of a DC-link VSCF system to provide backup auxiliary DC power capability with little weight penalty.

One of the principle adjuncts with generating systems of the latter type is that it does not usually incorporate apparatus for mechanically disconnecting the rotating generator from the propulsion engine coupling when the generator has a pump failure or when there is a loss of cooling-oil fluid which renders the generator incapable of producing electrical power output. Another variable speed generator is of the type described in U.S. Pat. No. 4,851,723 entitled "Coolant Pump System for Variable Speed Generators" which is also assigned to the present assignee, and would also provide a proper environment for the utilization of the presently intended lubrication system.

A faulty generator would continue to rotate until it is disengaged which is usually until either the shear section for the rotating shaft fails or until it is feasible for the maintenance crew to remove the generator from the airplane engine, which action would also suggest that it be replaced with an operative spare unit which calls for making the same available at the right time. This requires that for any degree of aircraft system availability, the number of spare generator units or line replaceable units must be increased to assure that a spare is available when needed.

When a constant speed drive and an associated generator is used, the number of spares needed for the constant speed drive is roughly double that for the number of generator spares required which remains the same. This is because specialized maintenance tools are required to service the constant speed drive, and this results in maintenance time for the constant speed drive that is roughly double that for the VSCF generator.

Another problem with a failed generator is that nearly immediate removal causes a severe impact upon schedules and dependability of commercial service. Unless means are provided for some lubrication to be applied to the bearings, the faulty generator must be removed within three hours after a malfunction of the lubrication system, otherwise permanent damage is anticipated. There is no requirement which prevents the commercial operator from flying an aircraft with a faulty generator as long as there are backups aboard the flyable system, and there is also the incentive for the operator to wait until the aircraft is present at an optimum repair facility before removal of the faulty generator, thereby operating with a minimal impact. Every time there is a pump failure or loss of the cooling-oil fluid by breakage of an external oil line in an electrical power generator, the complication to the air travel system is potentially immediate and may have consequential affects in both the short run and the long run.

SUMMARY OF THE INVENTION

In accordance with the present invention, a generator auxiliary lubricating system is provided for lubricating vital rotating components such as bearings, gears, and seals during an extended failure interim when primary cooling-oil lubrication has ceased because of pump failure, loss of fluid or otherwise.

The generator system generally comprises a compartment which contains the components for the rotating generator in a casing and a static components compartment with components which may serve as a voltage converter for the rotating generator and may also serve as a primary reservoir. The primary reservoir is in fluid communication with the generator compartment, for containing cooling-oil lubricant which also circulates through an auxiliary reservoir compartment which is structurally integrated with the generator casing. The rotating generator is coupled to an engine to produce electrical power output, and a scavenging pump is coupled to the generator to draw the lubricant from the primary reservoir for cooling and lubricating functions during productive rotational power generation. The cooling-oil lubricant in the auxiliary reservoir provides a gravity ready reserve-feed for the rotating generator, while passing through the auxiliary reservoir, before it overflows into the primary reservoir.

The auxiliary reservoir compartment has a plurality of gravity fed communicating passages providing a residual lubricating function for the rotating generating unit thereby lubricating critical rotating components during a fault mode of non-power output production. The auxiliary compartment collects the lubricant from the rotor which distributes it by energetically throwing the gravity fed lubricant to recycle it through collecting passages in the casing in order to retard damage and destruction of the coupled driving and generating units vital rotating components during an interim after the primary cooling and lubricating operations cease.

In accordance with another aspect of the invention, a power generation compartment is in fluid communication with the primary reservoir by way of the auxiliary reservoir through a port therein so that the return of the cooling-oil lubricant to the primary reservoir is by gravity flow. The rotating power generation compartment is separated from the primary reservoir by a baffle, with the relative position of the port for the fluid level in the auxiliary reservoir normally occupying a higher level than the fluid level in the primary reservoir so that the fluid overflows into the primary reservoir during power generation of electrical output.

BRIEF DESCRIPTION OF THE DRAWINGS

The invention may be better understood, and further advantages and uses thereof more readily apparent, when considered in view of the following detailed description of exemplary embodiments taken with the accompanying drawings in which.

DETAILED DESCRIPTION OF THE PREFERRED EMBODIMENTS

The invention is a new and improved generator system adaptive, cooling-oil lubrication system and a method of operating a generator system after a failure has occurred in the primary cooling and lubricating system for the generator and its associated components. An aircraft generator of the variable speed constant frequency (VSCF) type is preferred for generating AC power for multi- or three-phase power with a frequency of 400 Hertz. These common requirements are to be met aboard multi-engine aircraft of the jet propulsion type. The requirements are similar for both military and commercial operations, with the state of the art in systems technology being specially adapted to meet the disciplinary requirements for both of these regimes. Constant speed drive generators (CSD) provide an alternative approach to constant frequency power generation aboard an aircraft, but these suffer an apparent weight penalty of approximately 80 pounds for each combined CSD and generator assembly when used to fulfill a unit of power generation required. This requirement is fulfilled more efficiently in terms of weight reduction by the VSCF unit.

The new and improved generator system, cooling-oil lubrication system and method are described by illustrating only those parts of a generator system pertinent to the understanding of the invention and supplemental portions of the generator system have been incorporated by reference to an allowed U.S. patent as assigned to the same assignee as the present application.

Accordingly, U.S. Pat. No. 4,554,501 describes a variable speed constant frequency power system with a DC link pair of conductors in which a DC voltage is produced, regulated, and switched to an auxiliary output upon a condition of the generator operated below its normal speed range or when commanded to do so by signal. Normally, however, the system provides a variable speed generator connected to the output shaft of a propulsion engine operating throughout the spectrum of idle-to-cruise speeds, and the DC-link converter inputs the DC voltage to an inverter which produces a three-phase output which is maintained at a constant 400 Hz for the power usage requirements of an aircraft.

The three-phase output voltage and a grounded neutral are fed back through a monitor for voltage regulation to control the voltage of the input AC generator when the generator is operating within a speed range considered normal in the range of 2,000 to 12,000 revolutions per minute (rpm), and although the speed range for the VSCF generator which forms the subject of the present invention extends to a speed of 28,000 rpm to be within its normal speed range. Likewise, the rated DC-link of the incorporated-by-reference U.S. patent was provided in an exemplary 20 kVA system while the present invention has been upgraded in the range of 30 to 50 kVA and is well suited for this purpose.

Figure 1:
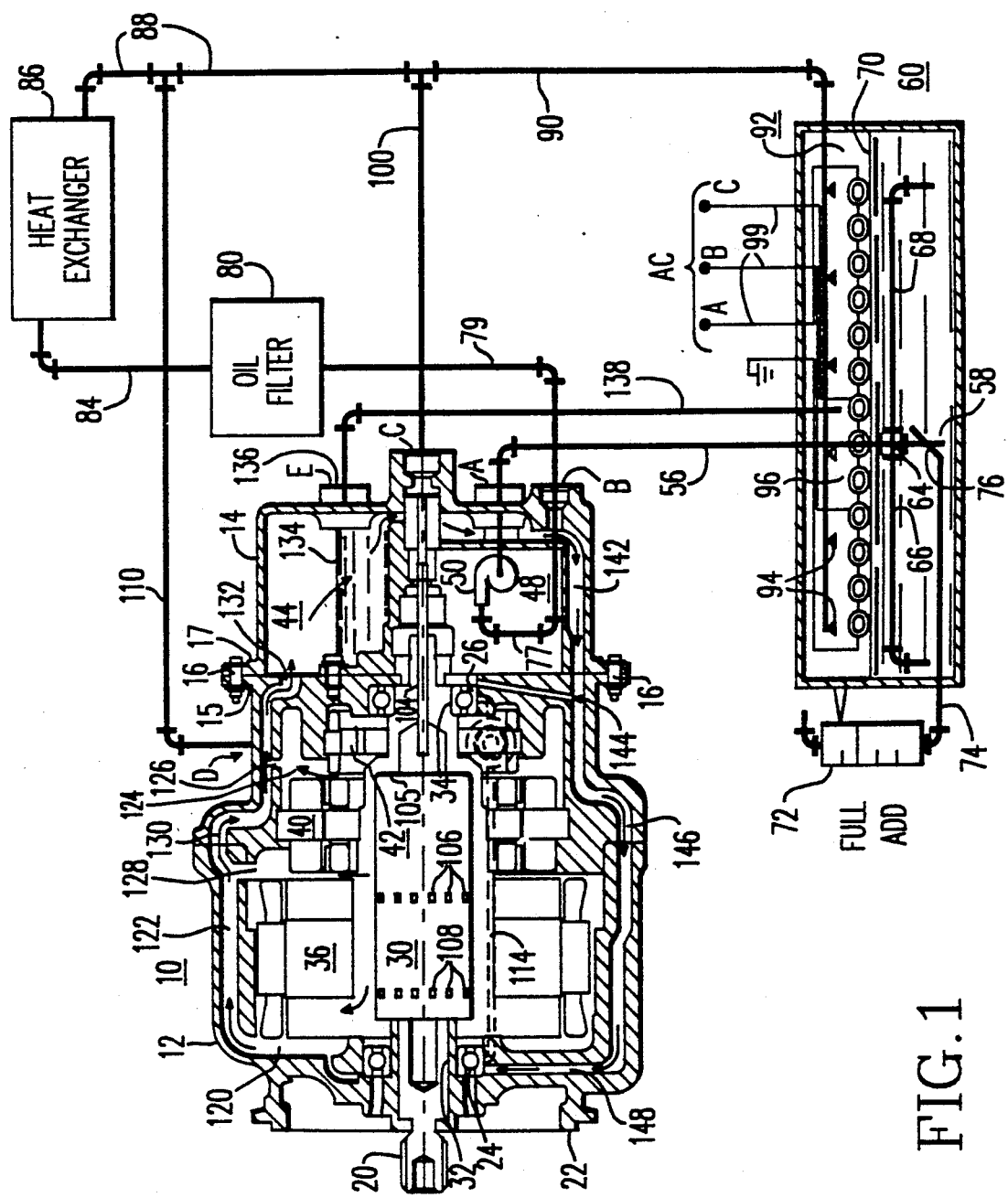
FIG. 1 is a functional block diagram, component arrangement shown in relation to a cross-sectional elevational view of a variable speed generator constructed in accordance with the present invention with a primary reservoir located in a separate compartment below the rotating generator.

More specifically, FIG. 1 shows a VSCF generator system of the present invention in functional block diagram form for the primary components of the cooling-oil lubrication system used in conjunction with and integrated internally within a generator system 10 which utilizes the teachings of the invention. The lubrication system component arrangement for the constant frequency generator 10 generally includes a georotor pump 50 which scavenges through a pump inlet port A, a cooling-oil lubricant within a primary reservoir 60. The pumping action drives the fluid lubricant through a pump discharge port B and through an oil filter 80 before driving it through a heat exchanger 86 after which the cooling-oil lubricant is dispensed under pressure to a rotor inlet port C in the generator casing and also to the rotor bearing and gear inlet port D which is located on the side of the generator casing 13. This is mapped in phantom for the side of the generator casing, as seen with cross-reference to the showing in FIG. 2 at a location of approximately 4:00 PM or 400 hours.

The general arrangement in FIG. 1 is completed with the return path for the fluid lubricant from the generator 10 through the overflow oil outlet E which carries the oil back into the primary reservoir 60 where its normal circulation route has an ending location. The elemental fluid path connections are shown as pipe fittings in FIG. 1 in order to illustrate the functional path for fluid which assumes that the pump is operative in order for fluid to traverse this network. This association of an integral structure of component parts is intended to provide clarity in the operational requirements of the fluid system which will be further discussed in conjunction with the association of more detailed enlarged cross-sectional views. The pressure passages of FIG. 3 and the gravity feed and rotor energy return passages shown in FIG. 4, are cross-sectionally related to the end view of the generator casing shown in FIG. 2.

Figure 2:
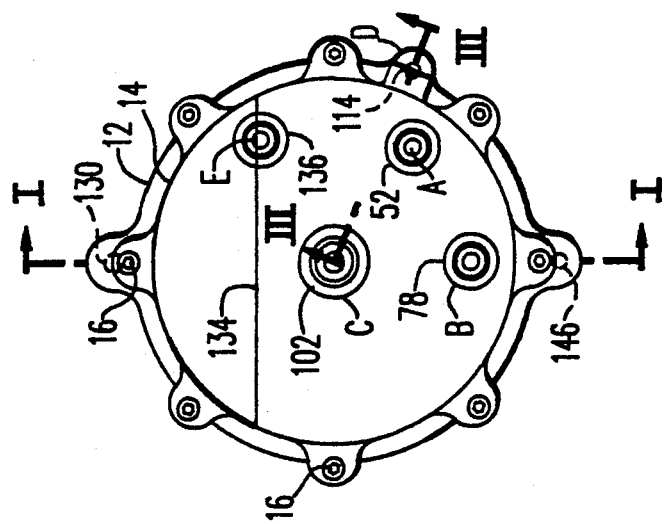
FIG. 2 is an end view of the rotating generator for section 1—1 shown in FIG. 1, showing the relative location of the overflow port "E" of the auxiliary reservoir with respect to other ports and passages.

The structure of the constant frequency generator 10 proceed from joining a generator casing 12 with a cup-end casing 14 by the joining of respective mating flanges 15, 17. These are fastened together by a fastening means 16 at a plurality of arcuate locations distributed in equal octal arcs around the cup flange 17 as shown in FIG. 2. A splined drive shaft 20 is central to a bell housing 22 which components are adapted to engage with an accessory gearbox (not shown), which is driven by a shaft of a propulsion engine such as would be found located on either wing mounted to the fuselage or tail section a propulsion system for an aircraft.

A two part generator casing 12 and 13 provides bearing support for a rotor assembly 30, with a paired drive-end bearing 24 which is supported in shaft 32 and an anti-drive-end bearing 26 which is supported in shaft 34 which provide for high-speed rotation of the rotor assembly 30. The direct gear coupling of this rotor assembly 30, it should be remembered, is not normally disengageable from the gear-driven shaft of the engine gearbox coupled to the shaft of the propulsion engine during any flight regime.

When the constant frequency generator 10 is on-board and is generating electrical power output with normal fluid pump operation and an adequate supply of cooling-oil lubricant in the fluid system, the oil flow path is as previously mentioned above. The same is true with regard to the gear coupling between rotor assembly 30 and the engine when it is operative to generate electrical power output If the fluid pump 50, however, becomes inoperative or if there is a loss of oil in the system through a line or crack in the casing for the primary reservoir 60, or in one of the fluid connecting lines for the system, this would usually prevent both the pressurized or unpressurized circulation of the fluid oil in the primary cooling and lubricating system.

Figure 3:
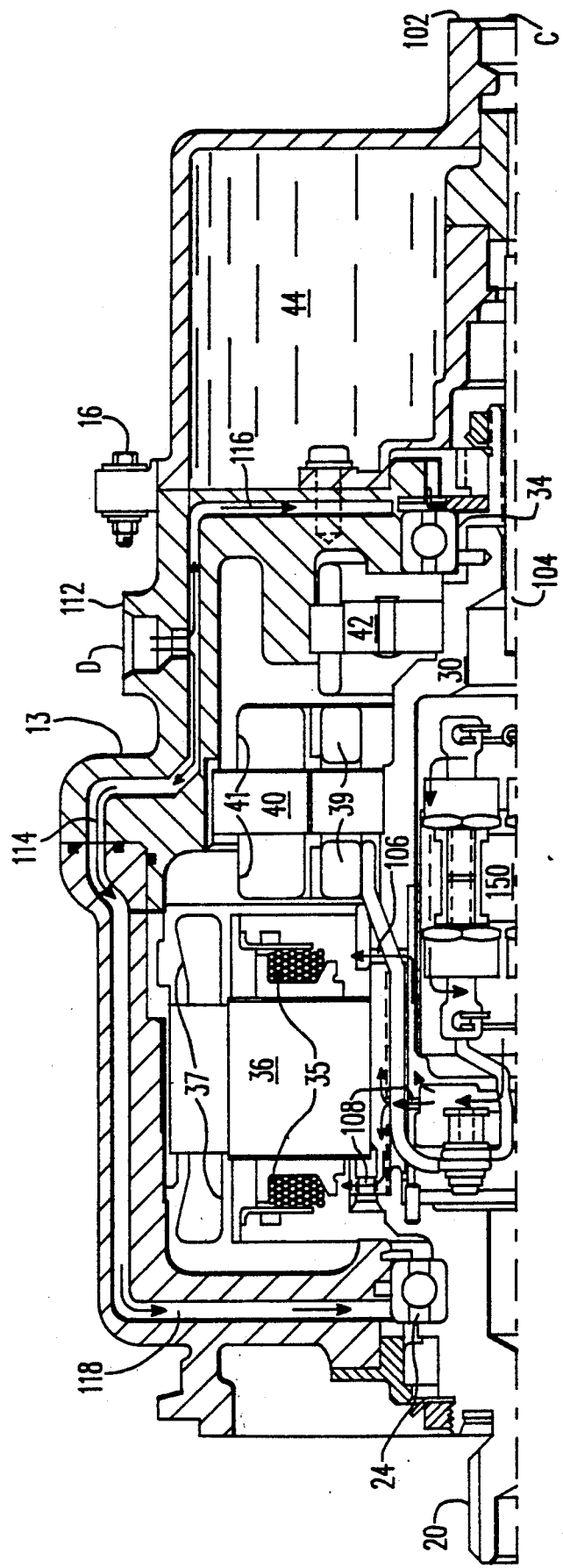
FIG. 3 is an enlarged cross-sectional view of section 3—3 of FIG. 2 showing the main cooling-oil lubricant pressure inlet port "D" which supplies the bearings and gears of the constant frequency generator during normal electrical power production.
Figure 4:
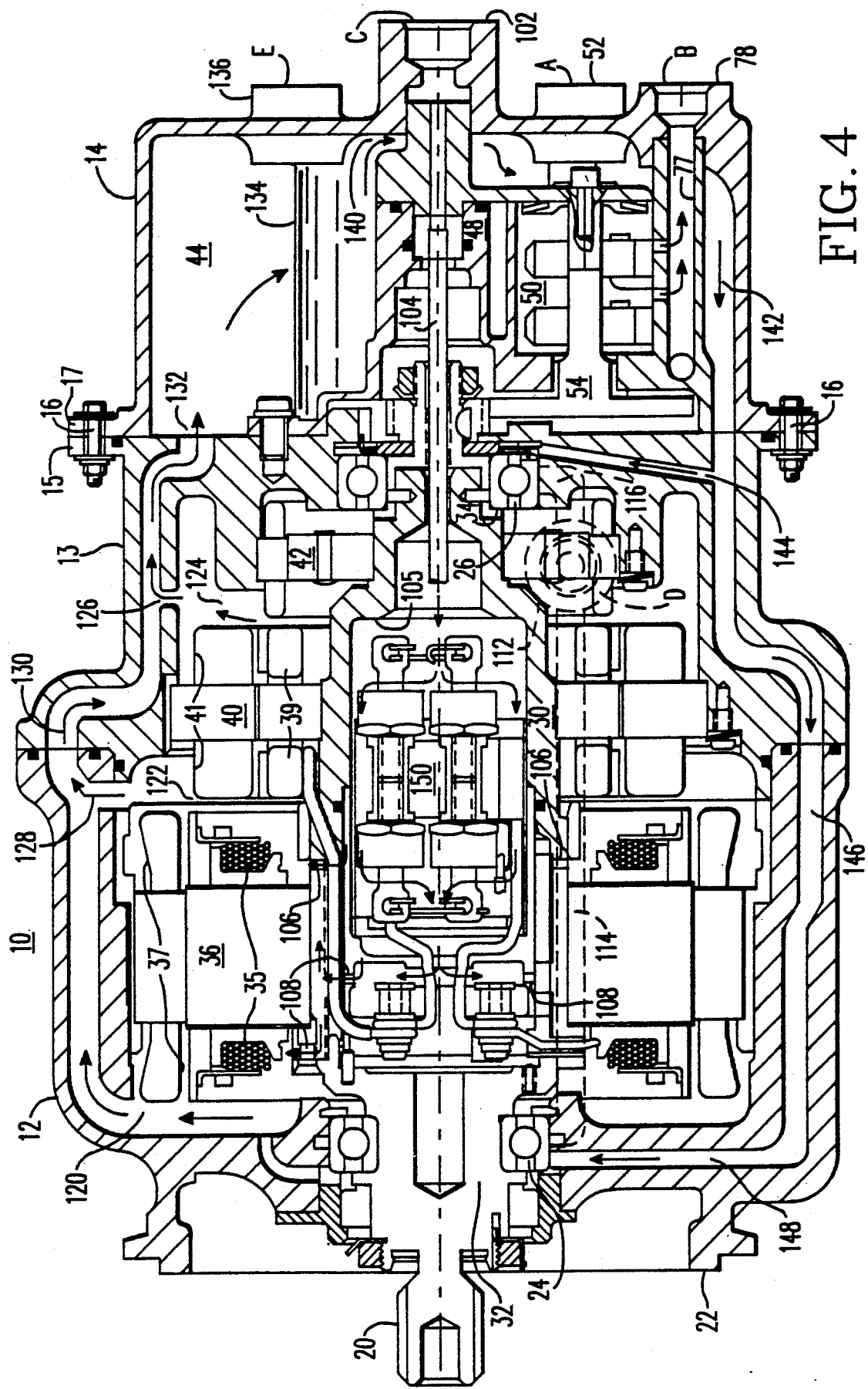
FIG. 4 is an enlarged and more detailed cross-sectional showing through section 1—1 of the constant frequency generator of FIG. 2 with the rotor assembly in place for the rotating field winding, the rotating exciter AC winding, and the rectifier assembly within the core of the rotor.

The rotor assembly 30 of FIG. 1 is peripherally surrounded at the drive-end of the rotor by a main field winding pair 36 which is comprised of a rotating field winding 35 and a main stator winding portion 37 which circumferentially surrounds the field winding portion as better seen with respect to FIG. 3 and especially FIG. 4. This main field winding pair 35, 37 produces a tremendous amount of heat when the VSCF generator 10 is rotationally operating in a power output mode when the generator is being relied upon to produce the power for the electrical load requirements of the airplane. Similarly, there is heat production by the adjacent and more centrally located set of windings in the exciter winding pair 40. This pair is comprised of a rotating exciter winding 39 and an exciter stator winding 41 which is used to produce AC currents on the rotor. The AC currents are fed through the rotor shaft to a rotating rectifier assembly 150 to provide DC power in order to put DC current into the rotating field winding 35. Some additional heat is contributed by a permanent magnet generator 42 which circumferentially surrounds the anti-drive end of the rotor assembly 30.

It is important to understand the system of passages for supplying, collecting, and distributing cooling-oil lubricant within the generator assembly 10. There is one aspect of the invention which stands out for recognition in relation thereto, and this is a feature which is adjacent to the anti-drive end of the rotor assembly 30. It is strategically placed in order to ensure that when the constant frequency generator 10 is operating in either an active power-producing mode of any capacity, or otherwise rotating without producing any power, there is an auxiliary reservoir compartment 44 which distributes continuously by gravity for an extended period of time, sufficient lubricating oil to prevent the destruction of bearings 24 and 26. The auxiliary reservoir compartment 44 is shown to be above and surrounding pump 50 in the lower compartment designated 48 within the cup-end generator casing 14. The pump 50 is a generator pump which may be more clearly seen in the pump compartment 48 of FIG. 4, and a pinion drive 54 is shown engaging the rotor assembly 30, proximate to its anti-drive end. This is in order to drive the dual elements of the georotor pump 50 so as to pressurize the fluid which is drawn through the pump inlet port A passing through a fitting connected into an embossment 52. The fluid is pressurized out of the pump into a passage 77 which passes through the pump discharge port B through a fitting inserted into embossment 78 and through the pressurized cooling-oil line 79 and into the oil filter 80. Then it passes through a filtered oil supply line 84 and a heat exchanger 86 which processes to exchange the heat of the oil. The heat of the cooling-oil lubricant is exchanged with an abundant medium of exchange such as air or engine fuel, in so doing increasing the temperature of the latter to a limited extent which may be beneficial to combustion.

The cooled oil supply line 88 branches to the left as rotor oil supply line 100 which enters the cupend casing 14 through a fitting connected in an embossment 102 for the rotor oil inlet port C. A central bayonet 104 with metering orifice connects an oil pressure entrance assembly to the anti-drive end entrance to the rotor interior core 105 of the rotor assembly 30. The metering orifice in the bayonet 104 limits the amount of oil entering the rotor. After the oil leaves bayonet 104 the centrifical action of the rotor causes the oil to leave the interior core 105. There is provided a plurality of circumferential apertures 108 in a location near the drive end of the rotor core 105. The rotor core resembles a tube-type solid telescope in its cross-sectional appearance, as it is more readily seen in the cross-section of FIG. 4. The apertures 108 circumferentially communicate the pressurized lubricating oil in a radial outward fashion with the pressurized oil spraying the end-turns of the rotating field winding 35 as the pressurized oil leaves the interior rotor core 105 through this end of the rotor assembly. There is an equal supplement (not shown) of apertures 108 with the total number in a set of 12 having an arcuate spacing of 30 degrees therebetween. A similar set of apertures 106 in the interior rotor core is located approximately in the middle of the rotor and positioned such that the centrifuged oil is directed onto the end-turns of the rotating field winding 35 in a space spraying the coolant on the drive-end side of the rotating exciter windings 39. This spray may also reach the exciter stator windings 41 as will spray through apertures 108 reach the main stator windings 37.

A rectifier assembly 150 electrically rectifies the AC currents which are on the rotor as produced by the exciter winding pair 40, which acts as a generator of these AC currents while the rectifier assembly 150 converts this to provide the DC power to put the DC current into the rotating field winding 35 of the main field winding pair 36. A pump pressure of 30 pounds per square inch (psi) at rotor oil inlet port C is reduced by the metering orifice in bayonet 104 to the gas pressure within core 12. When the oil leaves the rotor assembly through apertures 108 and apertures 106, sufficient energy is imparted to the oil to cause it to traverse passages 120, 122 and 130 at the top of casings 12 and 13 and into the auxiliary reservoir compartment 44 in order to achieve a fluid level of approximately the height of an embossment 136. This is at the overflow oil outlet E from which the oil drains by gravity through a return oil line 138 into the primary reservoir 60, as long as there is a primary circulation path for oil in existence. This is dependent on normal operation of the pump 50, with filter 80, and heat exchanger 86, along with the associated connecting oil lines.

The above flow will not be the case if there is a failure of pump 50 or the loss of the oil in the primary reservoir 60. The description thus concluded describes the principal cooling operation of the cooling-oil lubricant for the main field winding pair 36, the exciter winding pair 40, permanent magnet generator 42 and the rotor assembly 30 including the rectifier assembly 150 located within its core. Heat is removed from the circulation of the cooling-oil lubricant through the core passages in a constant stream with the heat being dissipated through the heat exchanger 86 path as previously described which functions for an operative power output producing generator.

If the cooling system fails, a red light will come on in the cockpit to warn the pilot who deenergizes the generator system, or the generator system will electrically fail on its own because of overheating which causes a trip to occur. This will shut down the power generation system, but the rotation of the rotor assembly 30 must continue with a need for bearing lubrication for bearings 24 and 26. Only minor friction and windage heating effects are thereafter present which are relatively small in comparison to the heating load of a functioning generator.

An additional path for the pressurized oil is through the heat exchanger 86 to the primary oil supply line 110. A differential in pressure from 50 psi to 30 psi at the output of the heat exchanger 86 may occur. The primary oil supply line 110 is for the lubrication of the main bearings 24 and 26 along with the gear 54 in order to drive the georotor pump 50. The primary oil supply line 110 enters the generator casing 13 through a fitting in an embossment 112 which is shown best in FIG. 3, although this is also shown in dashed concentric circles in FIG. 4. This detail is immediately to the left of the anti-drive bearing 26. A core passage 114 is sufficiently restrictive to cause the pressurized oil to be supplied through a vertically oriented core passage 118 to the drive-end bearing 24 at a proper rate to provide lubrication for high-speed operation of generator 10. A similar but more restricted passage 116 similarly provides the lubrication path for the oil flow to the anti-drive bearing 34 under normal operating conditions to which these bearings must be sustained. They would not continue to be sustained in their undamaged state if the oil being supplied under pressure in this supply path was stopped altogether by failure of the pressure oil supply system as previously referred to in greater failure permutations.

The invention is more readily seen to be integrated into the system thus far described with reference to FIG. 4, although the auxiliary reservoir 44 has been described in relation to the normal power-generating operation. Collecting oil from the core passages 120, 128, 130 while under the influence of gravity, the limited capacity of the auxiliary reservoir 44 continues to drain through overflow outlet E into the primary reservoir 60. There is a second gravity drain path 140 adjacent the inlet C end interior of the cup-end generator casing 14. This path follows a core passageway 142 around pump 50 by the action of gravity. Oil feeds into a gravity fed core passageway 146 in the bottom of the generator casing 12. The oil fills a nearly vertical feed path 144 to reach the anti-drive end bearing 26. It also feeds through the passage 148 to reach the drive-end bearing 24 and the seal associated at each end of the rotor assembly 30.

It should be noted that the auxiliary reservoir 44 is made to accumulate a level of oil 134 in the fill-up operation for the primary oil reservoir 60. A fill-up procedure should be used which ensures that there is sufficient oil in the system. The proper filling operation for the primary reservoir 60 ensures, for example in a preferred generator arrangement, that there is approximately one gallon or five liters of oil in the generator system casing when counting the contents of both reservoirs. Approximately one liter of oil is present in the auxiliary reservoir 44 when the system is full.

Exemplary of a fill-up procedure is one where the oil level in the primary reservoir 60 is monitored through a vented sight gauge 72 which is connected through a gauge inlet line 74 into the primary reservoir 60. A sump line 76 for the gauge inlet line 74 reaches across the bottom of the primary reservoir to monitor the same at its lowest level. The drive shaft 20 of generator 10 is rotated so that the pump 50 pressurizes the system sufficiently so that the auxiliary reservoir 44 overflows with the oil level at 134. The system is shut down and a reading is taken on the sight gauge 72, with additional oil being added to the primary reservoir 60 in order to get a full reading in the system before the aircraft is flown.

When the pressurized oil system fails during flight operation, with insufficient oil being left for operation in the primary reservoir 60, there is still an adequate amount of oil in the auxiliary reservoir 44 to provide a gravity distribution of oil to lubricate the main bearings 24 and 26. This occurs through the gravity drain passages 140, 142 in the cup-end casing 14 and the gravity feed passages 144, 146, and 148. The reserve oil supply through generator core passages 142, 146 should occur until all of the oil in the auxiliary reservoir is below the bearing races. Oil from the gravity feed passages is returned to the auxiliary reservoir by the action of the rotor which causes recirculation of the reserve oil for an extended period of time.

The oil in the auxiliary reservoir 44 acts under a positive gravity differential to feed oil to the bearings at a rate of flow of about 10 or 20 cc/min. The associated rotor oil core passage returns 120 and 130 allow the oil to egress from the generator rotating compartment through the auxiliary reservoir aperture 132. The mechanism for the realization of this return path is absent a pressurized oil supply spray through the interior of the rotor core 105.

It has been discovered that the oil seepage into the space surrounding the rotor assembly 30 is substantially by way of the bearings 24, 26. The oil is therein energized by dynamic action of the rotor imparting energy to the oil thus mentioned, so that it leaves the rotor surface at a velocity sufficient to begin to traverse the core passages 120 and 130 back to the auxiliary reservoir 44. This is in a continuous path for an extended electrical non-power producing operational period in excess of normal operating requirements for members of the commercial airline industry. This can exceed 100 hours of accumulated flying operations over a period of several days.

There is a further component of the electrical power producing unit of the variable speed constant frequency generator system 10 which is resident in the containment vessel for the primary reservoir 60. A third pressurized cooling-oil lubricant branch from the output of the heat exchanger 86 is through the cooled oil supply lines 88 and through an inverter spray-oil line 90 which enters the auxiliary reservoir 60 to supply a spray nozzle assembly 92. This comprises a linear series of multiple spray nozzles 94 which are exemplary formed from a long pipe with pin holes or shaped apertures to constitute a series of spray nozzles. Each nozzle is directed onto a stage or stages of a multiple stage inverter circuit assembly 96 which is to be electrically connected in circuit with the three-phase component windings of the constant frequency generator 10. The output of the three-phase inverter circuit is constituted by power transistors formed from a series of compression mounted ceramic-metallic hockey puck stages to provide the three-phase outputs A, B, C forming at the terminal outputs 99 as functionally but not operatively shown.

The pump oil supply line 56 merges into a sump line 58 directly below it which is situated within the primary reservoir 60 in a central region thereof. A multiple scavenger inlet 64 branches into a gauge-end scavenger inlet line 66 at the gauge-end and a similar scavenger line 68 extends to the sump side or end of the primary reservoir 60 in order to provide the ability to scavenge the cooling-oil lubricant during all flight regimes. These are mainly such as when the aircraft is diving and climbing or executing a turn in either direction by banking to port or starboard in the aircraft under operation.

Figure 5:
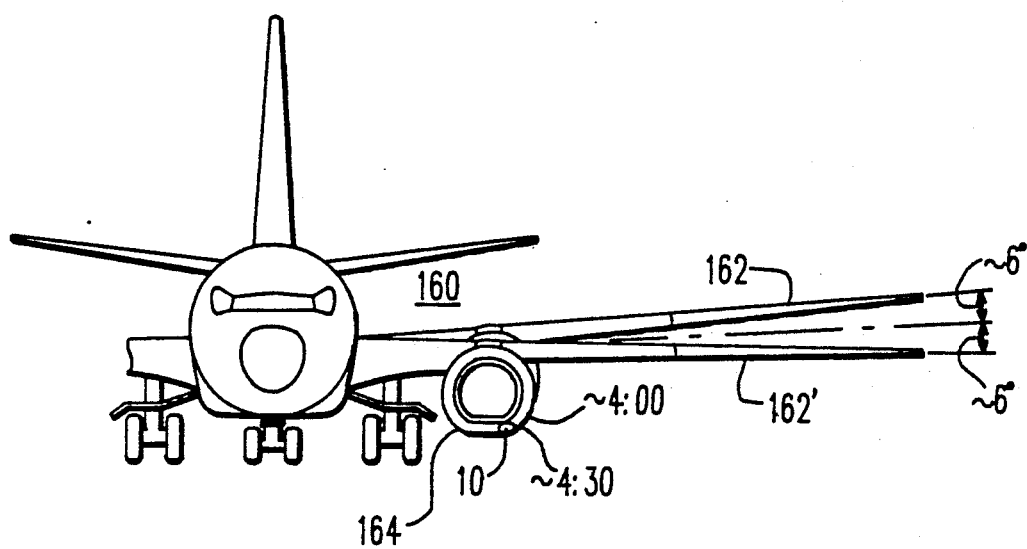
FIG. 5 is a reverse cockpit or nose-on view of a modern commercial jetliner shown to incorporate the variable speed constant frequency generator of the present invention located on the outboard side of the port propulsion engine.

FIG. 5 shows a nose-on half view facing the cockpit of a modern commercial jetliner 160 which is shown to incorporate in the engine nacelle 164, a variable speed constant frequency generator 10 of the present invention. The generator is shown located at approximately 4:00 o'clock or 400 hours on the pilot's port wing 162 when there is no fuel load, and it is shown at approximately 4:30 o'clock or 450 hours when there is a fuel load which deflects the wing downward approximately 6 degrees. This deflection is from a nominal position midway between the two superposed wing positions which is intended to illustrate the possibilities of the wing location in various fuel empty to full modes 162 and 162'. The particular fuel load in the wing can have a material effect on the reading of the sight gauge 72 with regard to its full reading, since for the nose-on view of the port or left wing, the weight of the fuel load rotates the wing clockwise downward so that a higher primary reservoir reading is seen in the sight glass. The same case of fuel load in the starboard or right wing rotates the wing counterclockwise down. On the starboard wing, however, the sight glass which is in the same orientation but on the inboard side reads lower for the same fuel load as the port wing because the generator is outboard of the port wing engine nacelle, as it is shown accordingly. Compensation needs to be made in order to ensure that there is a full measure of cooling-oil lubricant within the cavity of the auxiliary and primary, reservoirs for the optimized initial conditions for operation.

The disclosure teaches along with the lubricating system, a method of lubricating an aircraft generator casing after the failure of circulation of fluid from a primary reservoir compartment communicating with the generator casing and normally accumulating the cooling-oil lubricant, the method comprising:

providing a cooling-oil lubricated auxiliary reservoir compartment integrated with the generator casing so as to provide a supplement to primary cooling and lubrication functions;

providing a driving unit and a generating unit coupled thereto for producing electrical power output from said generating unit;

providing a primary pump for cooling and lubrication functions of generating unit during productive rotating electrical power generation;

casting said auxiliary reservoir compartment to be formed with gravity feed fluid communicating passages for providing a cooling function to said generating unit for friction and windage losses and a gravity feed lubricating function to said generating unit for lubricating critical rotating components; and spinning said generating unit during a fault mode of non-power output production of the generating unit so that said auxiliary compartment acts to collect and distribute the cooling-oil lubricant moved by the spinning action of said generating unit in order to circulate lubricant to retard damage and destruction of the coupled generating unit during an interim after one or more component primary cooling and lubricating operations malfunction.

What is claimed is:

1. A generator system adaptive, cooling-oil lubrication system, comprising:

a primary reservoir compartment and a power generation compartment in fluid communication with said primary reservoir compartment, said primary reservoir compartment being adapted for receiving from and pressurizing through an oil line to said power generation compartment, a cooling-oil lubricant;

a power generation section of said power generation compartment including means with a rotor rotatingly coupled to stationary means having a rotating electric field for producing electrical power generation output for said power generation section;

pump means for scavenging the cooling-oil lubricant at a plurality of indices of gravitational orientation for said primary reservoir compartment in order to pressurize the cooling-oil lubricant for forced return to said power generation compartment during operational cooling and lubricating of vital rotational and electrical components of said power generation section when fluid pressure and volume is within an established operational range;

a residual reservoir section of said power generation compartment in a casing adapted to cause primary recirculated fluid passage of the cooling-oil lubricant from said pump means, said casing having a plurality of fluid communicating passages for collecting and distributing a limited preselected volume of the cooling-oil lubricant to vital rotational components of said power generating section, the limited preselected volume being supplemental to a returnable primary fluid portion in the casing passages during normal fluid pressure operation of said power generation section, and the limited preselected volume of fluid being available for slinging the fluid to said communicating passages by rotor reaction during a fault or failure mode when the fluid pressure operation ceases, said rotor means thereby imparting an energetic release of the cooling-oil lubricant to replenish a portion of said fluid communication passages for continuously recollecting and redistributing the limited preselected volume of cooling-oil lubricant, which remains available during a fault or failure mode to vital rotational and nominal electrical components, without returning the cooling-oil lubricant to the primary reservoir compartment.

2. The generator system of claim 1 wherein said casing of said power generation compartment includes a port for fluid communication return to said primary reservoir compartment so that the fluid runs off by gravity flow of the cooling-oil lubricant from the residual reservoir section during normal fluid pump pressure operation of said power generation section.

3. The generator system of claim 2 wherein said power generation compartment is separated from said residual reservoir compartment by a baffle with the relative position of the port for the fluid level in the residual reservoir normally occupying a higher level than fluid level in the primary reservoir so that the oil-cooling lubricant overflows into the primary reservoir during power generation of electrical output.

4. The generator system of claim 1 wherein said power generation section includes static electronic means for converting variable speed (VSCF) driving power frequency to constant frequency electrical output power.

5. The generator system of claim 1 wherein said rotor means is rotatingly coupled through a geared shaft to the output shaft of a primary engine and said geared shaft is not readily disengageable from the generator system upon primary fluid loss or pump modes of generator failure.

6. The generator system of claim 1 wherein said rotor means includes a hollow shaft, the hollow of said shaft encompassing means rotating with said shaft, for rectifying electrical power generation, said means for rectifying being cooled by oil-cooling lubricant communicating through said shaft from a casing passage fitting and being under fluid pressure when said generator is in a production mode of electrical power generation.

7. The generator system of claim 6 wherein the fluid returning to the primary reservoir communicates through cooler means for cooling the heat-laden cooling-oil lubricant in order to extract the heat therefrom by interaction with a heat exchange medium.

8. The generator of claim 6 wherein said rotor means is coupled through a geared shaft to the output shaft of a primary engine and said generator is adapted to be driven through a constant speed drive unit.

9. The generator of claim 1 wherein said fluid collecting communicating passages for said residual reservoir section includes a plurality of collecting slots in the generator casing interior cavity, each slot being positioned to collect at least a portion of the limited preselected volume of cooling-oil lubricant being slung by rotor reaction during a fault or failure mode.

10. The generator of claim 9 wherein said fluid distributing communicating passages for said residual reservoir section includes a plurality of exit ports, at least one of said exit ports being located for fluid discharging of a portion of the cooling-oil lubricant onto the surface of said rotor adjacent the end turns at one end of said rotor, and at least the other of said plurality of exit ports being located for fluid discharging the supplemental portion of the cooling-oil lubricant onto the surface of said rotor adjacent the end turns at the other end of said rotor.

11. A generator sited, cooling-oil lubrication system, comprising:

a primary reservoir compartment and a power generation compartment in fluid communication with said primary reservoir compartment, said primary reservoir compartment being adapted for receiving from and pressurizing through an oil line to said power generation compartment, a cooling-oil lubricant;

a power generation section of said power generation compartment including rotor means electromagnetically coupled to stationary means having a rotating electric field for producing electrical power generation output for said power generation section;

pump means for scavenging the cooling oil lubricant at a plurality of indices of gravitational orientation from said primary reservoir compartment in order to pressurize the cooling-oil lubricant for forced return to said power generation compartment during operational cooling and lubricating of vital rotational and electrical components of said power generation section when fluid pressure and volume is within a predetermined operational range;

a residual reservoir section of said power generation compartment in a casing being adapted to capture a minor portion of the fluid from the passage of the cooling-oil lubricant from said pump means, said casing having a plurality of fluid communicating passages for collecting and distributing the captured portion of the cooling-oil lubricant to vital rotational components of said power generating section supplemental to a returnable major fluid portion in the casing passages during electrical output, under normal fluid pressure operation of said power generation section, said captured fluid portion being available in said residual reservoir section during a fault or failure mode when the fluid replenishment from the pump operation ceases, said rotor means including a rotor having a surface imparting an energetic release of the cooling-oil lubricant to form a fluid replenishing path for some of said fluid communication passages, thereby continuously recollecting and redistributing a trapped portion of cooling-oil lubricant to the vital rotational components, without returning the cooling-oil lubricant portion to the primary reservoir compartment, during the persistence of a fault or a failure mode.

12. A generator system comprising:

a generator casing;

a primary reservoir compartment communicating with the generator casing for containing a cooling-oil lubricant;

a cooling-oil lubricated auxiliary reservoir compartment structurally integrated with the generator casing so as to provide a supplement to primary cooling and lubrication functions;

a driving unit and a generating unit coupled thereto for producing electrical power output from said generating unit;

a primary pump for cooling and lubrication functions of said generating unit during productive rotating electrical power generation;

said auxiliary compartment having gravity fed fluid communicating passages for providing a cooling function to said generating unit for friction and windage losses and a gravity fed lubricating function to said generating unit for lubricating critical rotating components, during a fault mode of non-power output production of the generating unit;

said auxiliary compartment acting to collect and distribute the cooling-oil lubricant by the spinning action of said generating unit in order to retard damage and destruction of the coupled generating unit during an interim after one or more of the component primary cooling and lubricating operations malfunction.

* * * * *